United States Patent Office 3,383,181
Patented May 14, 1968

3,383,181
PROCESS OF HALOGENATING A
PHOSPHATE ORE
Mark M. Woyski, La Habra, James L. Bradford, Anaheim, and Henry H. Elliott, Fullerton, Calif., assignors to American Potash & Chemical Corporation, Los Angeles, Calif., a corporation of Delaware
No Drawing. Filed Apr. 8, 1965, Ser. No. 446,701
7 Claims. (Cl. 23—318)

ABSTRACT OF THE DISCLOSURE

A process for halogenation of phosphate ore which includes reacting a particulate mass of phosphate ore and carbon at a temperature sufficient to produce a product comprising metallic halide and volatile phosphorus-halogen compounds. The phosphorus-halogen compounds so produced are recycled to the reaction zone to increase the rate of said halogenation reaction.

This invention relates to the treatment of ores. More particularly, this invention relates to a process for the efficient recovery of valuable constituents from phosphate ores.

A large number of phosphate ores are known. Many of these ores contain valuable metallic constituents. Previously, considerable difficulty had been encountered in recovering both the metallic and phosphorus values from these ores.

Generally, it had been considered impractical to simultaneously recover both the phosphorus and metallic values from phosphate ores. Also, previous processes for the treatment of phosphate ores to recover either the metallic or phosphorus values generally required excessive amounts of expensive reagents.

Previous processes for the treatment of phosphate ores using halogen agents generally have been unsatisfactory because the reactions proceed so slowly and require such high temperatures that sintering of the reaction bed often occurs.

These and other difficulties of the prior art are overcome according to this invention.

Broadly, in carrying out the process of this invention, a heated reaction zone is established. The heated reaction zone contains a bed of particulate phosphorus ore. At least one halogenating agent is provided in the reaction zone. An effective amount of at least one reaction promoter is also provided in the reaction zone. The reaction zone is maintained at a temperature sufficient to convert any metallic values in the ore to metallic halides, and the phosphorus values in the ore to volatile phosphorus-halogen compounds. These volatile, easily recoverable phosphorus-halogen compounds include for example, phosphorus trichloride, phosphorus pentachloride, phosphorus oxychloride, phosphorus oxybromide, phosphorus tribromide, phosphorus chlorobromides and the like.

Suitable halogenating agents for use in the process of this invention include elemental chlorine and bromine as well as phosgene, the halogenated hydrocarbons such as tetrachloroethylene, hexachlorobenzene, carbon tetrachloride, carbon tetrabromide, mixtures thereof, and the like.

The reaction of a phosphate ore with a halogenating agent is unexpectedly catalyzed or promoted, in some manner which is not now fully understood, by the presence of the gaseous products of this reaction. These products consist primarily of phosphorus-halogen compounds.

Maintaining an effective concentration of the gaseous reaction products in the vaporous reaction phase surrounding the ore increases the rate of reaction substantially. Not only does this procedure increase the reaction rate but it also decreases the required reaction temperature.

While we do not wish to be limited to any theory it is believed that those phosphorus trihalides identified as phosphorus trichloride and phosphorus tribromide are the active agents which promote this reaction.

The phosphorus trihalide reaction promoters may be supplied from any source outside the reaction zone or they may be provided by generating them in situ in the reaction zone.

In general, one of the principal gaseous reaction products is a phosphorus oxyhalide identified as phosphorus oxychoride or phosphorus oxybromide. Phosphorus oxyhalides are generally not as effective in promoting the reactions of this invention as are the phosphorus trihalides. Generally, it is desirable to reduce the phosphorus oxyhalide reaction product to the corresponding phosphorus trihalide and then to use the phosphorus trihalide thus obtained as a reaction promotor in the reaction zone.

The phosphorus oxyhalide may be reduced to the trihalide in situ by contacting it with a reducing agent in the reaction zone, or it may be conducted to a suitable reducing zone outside the reaction zone where it can be reduced to the phosphorus trihalide. Combinations of these techniques may be used wherein a part of the phosphorus oxyhalide is reduced in the reaction zone and a part in a separate reducing zone.

Reduction of the phosphorus oxyhalide is generally accomplished by contacting it with carbon, carbon monoxide, metal carbides, metals, mixtures thereof and the like. The reduction of the phosphorus oxyhalide is conveniently accomplished in the reaction zone by providing solid charcoal in the reaction bed. Reduction may also be accomplished by providing carbon monoxide gas in the reaction zone. The reducing and halogenating agents may be supplied to the reaction zone as one compound. For example, when phosgene is supplied to the reaction zone it dissociates into chlorine gas and carbon monoxide gas. Chlorine serves as the halogenating agent and carbon monoxide as the reductant. Carbon monoxide may also be generated in the reaction zone by adding air or $O_2$ to a bed containing carbon.

When the phosphorus oxyhalide is reduced outside of the reaction zone, generally this is accomplished by passing it through a heated bed of charcoal. The use of charcoal is preferred because it is inexpensive, easily obtainable and permits a faster rate of reaction than some other forms of carbon, such as petroleum coke. Other suitable reductants include, for example, silicon carbide, titanium carbide, iron carbide, elemental silicon, titanium or iron, boron carbide and the like. The reactions between the carbides and phosphorus oxyhalides are generally exothermic. Conveniently, when carried out in the reaction zone, these exothermic reactions provide part of the heat required by the halogenation reaction.

Preferably, the reduction of the phosphorus oxyhalide is accomplished by contacting it with a heated bed of carbon in a reducing zone separate from the reaction zone in which halogenation is effected. This is preferred because it is generally desirable to employ higher temperatures in the reduction of the phosphorus oxyhalide than are suitable for the halogenation of the ore. The phosphorus oxyhalide is generally reduced by contacting it with carbon at temperatures in excess of 750° C. The use of solid carbon is preferred over the use of carbon monoxide because higher yields of phosphorus trihalide are obtained when carbon is used.

In general, the amounts of phosphorous-halogen compounds generated in this halogenation process exceed those required to promote the halogenation reaction. The excess phosphorus-halogen compounds may amount to 10 percent or more by weight in the gaseous reaction products. When the principal purpose in carrying out this process is to recover the metallic values in a phosphate ore, the production of the valuable by-product considerably enhances the economic efficiency of the process.

The reaction products of this process, including both the metallic halides and the phosphorus-halogen compounds, may be recovered by conventional techniques. For example, that portion of the vaporous reaction product which is not recycled may conveniently be condensed and fractionated to provide commercially pure phosphorus trichloride, phosphorus oxychloride, phosphorus pentachloride, phosphorus tribromide and the like. The reaction products may also be condensed and separated by fractional distillation, and certain fractions can then be recycled to the reaction zone, such as, for example, a fraction high in $PCl_3$. The solid products produced in this reaction may be removed from the reaction bed and then solubilized, using, for example, dilute aqueous acids. These solutions may be further treated as desired to obtain the metallic values in the form desired.

This process is applicable to phosphate ores in general and is particularly useful in treating phosphate ores identified as monazite, xenotime, triphylite, pyromorphite, lithiophilite, amblygonite, apatite and apatite group ores, phosphate rock, lazulite, wavellite, variscite and the like. The specific metallic elements which are contained in these phosphate ores and wihch can be converted to the corresponding chlorides or bromides by this process include the rare earths, thorium, yttrium, scandium, lithium, calcium, lead, aluminum, magnesium and the like.

Carrying out this process on a monazite or xenotime ore at a reaction temperature below about 725° C. advantageously results in the production of a solid reaction product which is a dry, free-flowing mixture of rare earth and thorium halides. Conveniently, many of the metallic impurities in the ore from halides which are vaporized at temperatures well below 725° C. Metallic impurities such as titanium, iron, aluminum and silicon are vaporized as the corresponding halides and thus, automatically separated from the solid rare earth halides during the reaction.

This process for the halogenation of phosphate ores can be carried out at reaction temperatures ranging from about 400 to 1000° C., or even higher, preferably at a reaction temperature between about 550° C. and 725° C. Between about 725° C. and 800° C. the non-volatile reaction products are generally sticky and have a tendency to sinter or agglomerate. This tendency to stickiness precludes operating with monazite ore in an agitated bed much above about 750° C. Phosphate ores which form high melting halides can be reacted at higher temperatures. In general, the reaction temperatures range from about 400° C. up to about the sintering point of the solids in the reaction zone. Generally, the sintering point of a bed of solids is approximately the melting point of the metallic halides formed during the reaction.

The present process is flexible and may be carried out in a batch, semi-batch or continuous manner. This process may be carried out in a wide variety of apparatus including, for example, static bed reactors, agitated bed reactors, such as fluidized bed reactors, bubble bed reactors and the like. Preferably, this process is carried out in an agitated bed reactor. The most rapid and complete reactions are obtained in this apparatus and temperatures can be controlled precisely, thus preventing agglomeration of the solid reaction product.

When internally agitated beds, such as fluidized or bubble beds, are used in carrying out this process the agitating agent for the particulate ore may be any of the phosphorus-halogen compounds, carbon monoxide, the gaseous halogenating agent, phosphorus trihalide, phosphorus oxyhalide, a non-reactive gas such as nitrogen, argon or helium and mixtures thereof. Mechanical means may also be used for agitating the particulate ore. If a phosphorus oxyhalide is used as the agitating agent, preferably a reductant is provided in the reaction zone so that an amount of phosphorus trihalide sufficient to promote the reaction will be provided in that zone. The most preferred agitating agents are phosphorus trihalide, carbon monoxide, and mixtures thereof.

It will be understood that the term "rare earth" as used herein includes: those elements of the lanthanide series, having atomic numbers from 57 through 71, inclusive. Conveniently, the term "rare earth" is abbreviated "Re" herein.

In the instant specification, appended claims and following specific examples, all parts and percentages are by weight unless otherwise indicated. The following examples are set forth to further illustrate, not to limit, the invention, whereby those skilled in the art may understand better the manner in which the present invention can be carried into effect.

Example I

This example is illustrative of the treatment of a mixture of a phosphate ore and charcoal with a vaporous reaction stream containing phosgene and phosphorus trichloride without recycle of the vaporous reaction products.

The monazite ore used in this example contains a total rare earth and thorium content of about 69 weight percent, expressed as the oxide, of which about 9.5 weight percent is $ThO_2$ and about 59.5 weight percent is $Re_2O_3$. This ore also contains about 3 weight percent oxides of Si, Fe, Al, Ca and Mg and about 26.5 weight percent of phosphorus, expressed as $P_2O_5$. This ore, having an original particle size of $-65 +150$ mesh (U.S. Standard) is reduced to about $-325$ mesh by ball milling.

The apparatus used in this example consists of a 36-inch long quartz tube having an inside diameter of ¾ of an inch.

This tube is mounted vertically, and the reaction mixture consisting of about 45 grams of $-325$ mesh monazite ore and about 45 grams of a finely divided charcoal is supported in the central nine-inch section of the tube on a bed of coarse charcoal. This central nine-inch section of the tube, containing the reaction bed, is centrally located inside the annular interior of an eighteen-inch long resistance heating element. Gaseous and liquid reactants are fed to the top of the reaction tube and the vaporized reaction products are removed from the bottom of the tube. The temperature of the monazite-charcoal reaction bed is monitored by a thermocouple inserted in the bed.

The reaction bed and the surrounding tube are preheated to a temperature of about 690° C. while a stream of dry argon is passed through the tube before the phosgene and phosphorus trichloride are introduced. The argon sweeps the reaction zone free of water vapor and oxygen.

About 85 grams of phosgene and about 26 grams of phosphorus trichloride are added to the tube simultaneously at a uniform rate over about a 5 hour period while the temperature of the reaction zone is maintained at about 690° C. The phosgene dissociates almost completely into chlorine and carbon monoxide.

The vaporous reaction product contains phosphorus trichloride, phosphorus oxychloride, carbon monoxide, carbon dioxide, traces of phosgene, traces of free chloride and towards the end of the reaction period, some phosphorus pentachloride.

Analysis of the solid reaction product contained in the reaction bed shows that more than 95 weight percent of the rare earth and thorium values in the bed are converted to the corresponding chlorides.

Example II

This example is illustrative of the results obtained when chlorine is used as the halogenating agent for a mixture of phosphorus ore and charcoal without the use of a reaction promoter and without recycle of the vaporous reaction product.

The apparatus, procedures, charcoal and monazite ore used in this example are the same as those described in Example I, above. About 65 grams of chlorine are supplied to the top of the reaction tube at a uniform rate during a 4½ hour period while the temperature of the reaction bed is maintained at about 690° C.

The vaporous reaction product which is withdrawn from the bottom of the tube contains phosphorus trichloride, carbon monoxide, carbon dioxide, phosphorus oxychloride and traces of free chlorine and phosphorus pentachloride.

Analysis of the solid reaction product remaining in the bed shows that the conversion of the thorium and rare earth values contained in the monazite at the top of the bed is about 22 weight percent while about 83 weight percent of the thorium and rare earth values present in the monazite at the bottom of the bed are converted to the corresponding chlorides.

This example illustrates that the presence of the gaseous reaction products in the lower part of the bed considerably enhances the halogenation of the phosphate ore.

Example III

This example is illustrative of the process of this invention carried out using internally agitated bed techniques without a reaction promoter.

The apparatus used in this example consists of a 1-inch internal diameter, vertically mounted quartz tube. The monazite ore particles to be fluidized are placed in the tube and a fluidizing gas and gaseous reactants are admitted at the bottom of the tube. Gaseous reaction products, unreacted reactants and the fluidizing gas are withdrawn from the top of the tube. The tube is preheated to a temperature of about 690° C., and swept with a stream of dry helium to remove any water and oxygen from the reaction zone. Monazite ore, having the composition described in Example I above, and a particle size of −80 mesh (U.S. Standard) is used. The bed of monazite is fluidized with $POCl_3$ gas while a total of about 52 grams of $COCl_2$ is supplied to the reaction zone at a uniform rate over a period of about 205 minutes. Examination of the solid residue indicates that less than about 0.5 weight percent of the rare earth and thorium values in the monazite have been converted to the corresponding chlorides by this reaction.

Example IV

This example is illustrative of the process of this invention carried out in an internally agitated bed using pelletized solid reactants and a reaction promoter.

The apparatus used in this example is the same as that described in Example III, above. The pellets used in this example are prepared by admixing and pelletizing about seven parts by weight of monazite ore of the composition described in Example I above, and having an average particle size of −325 mesh (U.S. Standard), about one part by weight of finely divided carbon and about 0.4 part by weight of rare earth chloride. The rare earth chloride serves as a binder. The pellets have a particle size of −40 +60 mesh (U.S. Standard). The reaction zone is preheated to a temperature of about 670° C., and swept free of oxygen and water by a stream of dry argon. These pellets are fluidized in the heated reaction zone in a gaseous stream containing about 10 weight percent $PCl_3$ and about 90 weight percent $POCl_3$. About a 31 gram quantity of chloride gas is added to the fluidizing stream at a uniform rate over the course of the reaction. The reaction is continued at a temperature between about 670° C. and 690° C. for about 120 minutes. Most of the thorium and rare earth values in the pellets are converted to the corresponding chlorides.

Repetition of Example IV using a fluidizing gas containing about 99 weight percent $POCl_3$ and about 1 weight percent $PCl_3$ results in a somewhat reduced rate of reaction.

The reaction rate is increased considerably over that obtained in Example IV by repeating that example using a fluidizing gas containing about 50 weight percent $PCl_3$ and about 50 weight percent $POCl_3$.

The repetition of Example IV using a fluidizing gas containing about 10 weight percent $PCl_3$, about 10 weight percent $PBr_3$, about 40 weight percent $POCl_3$ and about 40 weight percent $POBr_3$ and a halogenating agent containing about 50 weight percent of chlorine gas and about 50 weight percent of bromine gas results in the recovery of substantially all of the rare earth and thorium values in the monazite ore as mixed chlorides and bromides.

A much faster reaction occurs when Example IV is repeated using a fluidizing gas comprising a mixture containing about 25 weight percent $POCl_3$ and about 75 weight percent $PCl_3$ at a temperature of about 700° C.

Example IV is repeated using argon as the fluidizing gas. A gaseous admixture containing about 15 weight percent chlorine and about 85 weight percent $PCl_3$ is supplied to the reaction zone continuously. The gaseous reaction products, in addition to argon, contain an admixture consisting of about 40 weight percent $POCl_3$ and about 60 weight percent $PCl_3$. The $POCl_3$ is contacted with a bed of wood charcoal heated to a temperature of about 800° C. The $POCl_3$ is converted to $PCl_3$ by reaction with the wood charcoal. The $PCl_3$ thus generated is combined with that produced in the reaction zone for recycle to the reaction zone. That portion of the $PCl_3$ which is not recycled to the reaction zone is withdrawn from the system. The amount of $PCl_3$ withdrawn from the system amounts to about 10 weight percent by weight of the vaporous phosphorus-chlorine reaction products produced by the halogenation reaction.

Example I is repeated using pyromorphite in place of monazite and satisfactory results are obtained in recovering both the lead and phosphorus values from the ore.

High yields of phosphorus-chlorine compounds are obtained when Example I is repeated using apatite in place of monazite.

The repetition of Example II, with a recycle of the vaporous reaction products, results in a substantially higher yield of rare earth and thorium chlorides.

Repetition of Example I using a reaction temperature of about 1000° C. results in a reaction time of about one hour. However, considerable thorium chloride appears in the gaseous reaction product and the non-volatile reaction products are fused into a solid mass.

Repetition of Example I using various promoters and halogenating agents gives the results indicated below. The substitution of phosphorus tribromide for phosphorus trichloride and elemental bromine for phosgene results in substantially quantitative yields of rare earth bromides. The substitution of carbon tetrachloride and hexachlorobenzene respectively, in two separate examples for the phosgene in Example I, results in substantially quantitative yields of rare earth chlorides. The substitution of silicon carbide for carbon and elemental chlorine for phosgene in a repetition of Example I results in acceptable yields of rare earth chlorides.

The amounts of halogenating agent and promoter used to effect the treatment of phosphate ores, according to the process of this invention, vary considerably, i.e , from approximately stoichiometric amounts to several hundred times the stoichiometric amounts required to react with the phosphate ore. The physical characteristics of the reaction system strongly influence the halogenating agent and reaction promoter requirements. For example, large excesses of halogenating agent and promoter may be required to complete the reaction when the ore particles are relatively large or when the reactants are not adequately admixed during the reaction. There is substantially no limit to the amounts of halogenating agent and promoter which can be used. Amounts of halogenation agent or promoter several thousand times in excess of stoichiometric amounts may be used if desired. If either the halogenating agent or the promoter is used as the agitating agent in an internally agitated bed large excesses above the stoichiometric amounts are used to accomplish adequate agitation.

The reactants may be supplied to the reaction zone at any desired rate. In general, only a small fraction of the stoichiometric amounts of gaseous reactants will be present in the reaction zone at any one time. Super-atmospheric pressures may be used if desired to increase the concentrations of the gaseous reactants in the reaction zone. Such super-atmospheric pressures are not, however, necessary in carrying out the halogenation of this invention. Unreacted gaseous reactants pass through the reaction zone and are generally collected for recycle.

The total amount of phosphorus trihalide promoter provided in the reaction zone during the course of the reaction may be as little as 0.1 percent, preferably at least 1 percent by weight of the stoichiometric amount of halogenating agent. Supplying promoter to the reaction zone in these quantities at a uniform rate during the course of the reaction will measurably improve the results.

Preferably, the halogenation reactions of this invention are carried out in a substantially oxygen-free reaction zone. The exclusion of oxygen from the reaction zone prevents the metallic values in the ore from being converted into water-insoluble metallic oxides. Oxygen is conveniently excluded from the reaction zone by conventional techniques such as, for example, sweeping the reaction zone with an inert gas, such as helium, maintaining the pressure in the reaction zone slightly above atmospheric values during the halogenation reactions or applying a vacuum to the zone.

Preferably, the phosphate ore is finely divided to insure intimate contact with the halogenating agent. Satisfactory results are obtained using particulate ores having particle sizes ranging from about 1 inch or more to 1 micron or less.

Preformed briquettes of ore or mixtures of ore and charcoal, with or without suitable binders, and having average diameters up to several inches, also are suitable for use in the process of this invention.

The present process is highly efficient and results in the recovery of substantially all of the phosphorus and metallic values contained in the phosphate ore. These values are recovered by treating the phosphate ore for a period of time sufficient to convert at least the major amount of its metallic elements to the corresponding halides and at least the major amount of its phosphorus values to vaporous phosphorus halogen compounds. The time required to accomplish this conversion varies widely, depending, for example, on such parameters as the temperature, ore particle size, nature of the halogenating agent, nature of the ore, thoroughness of admixture between the halogenating agents and the ore and the like. In general, this period of time ranges from about five minutes or less to about 10 hours or more.

As will be understood by those skilled in the art, what has been described are preferred embodiments of the invention, however, many modifications, changes and substitutions can be made therein without departing from the scope and the spirit of the following claims.

What is claimed is:

1. In a process for halogenating phosphate ore which includes reacting a mixture comprising particulate phosphate ore and carbon with a halogenating agent in a reaction zone at a temperature sufficient to produce a product comprising metal halide and volatile phosphorus-halogen compounds, the improvements which comprise increasing the rate of the halogenation reaction by recycling to the reaction zone at least a portion of the volatile phosphorus-halogen compounds produced.

2. In a process for halogenating a phosphate ore which includes reacting a mixture comprising particulate phosphate ore and carbon with a halogenating agent in a reaction zone at a temperature sufficient to produce a product comprising metal halide and volatile phosphorus-halogen compounds, the improvements which comprise replacing the carbon and halogenating agent with phosgene and increasing the rate of the halogenation reaction by recycling to the reaction zone at least a portion of the volatile phosphorus-halogen compounds produced.

3. In a process for halogenating phosphate ore which includes reacting a mixture comprising particulate phosphate ore and carbon with a halogenating agent in a reaction zone at a temperature sufficient to produce a product comprising metal halide and volatile phosphorus-halogen compounds, the improvement which comprises introducing into said reaction zone at least one phosphorous trihalide, produced outside said reaction zone, in an amount effective to increase the rate of the halogenation reaction.

4. In a process for halogenating a phosphate ore which includes reacting a mixture comprising particulate phosphate ore and carbon with a halogenating agent in a reaction zone at a temperature sufficient to produce a product comprising metal halide and volatile phosphorus-halogen compounds, the improvements which comprise replacing the carbon and halogenating agent with phosgene and introducing into said reaction zone at least one phosphorus trihalide, produced outside said reaction zone, in an amount sufficient to increase the rate of the halogenation reaction.

5. In a process for halogenating phosphate ore which includes reacting a mixture comprising particulate phosphate ore and carbon with a halogenating agent in a reaction zone at a temperature sufficient to produce a product comprising metal halide and volatile phosphorus-halogen compounds, the improvements which comprise increasing the rate of the halogenation reaction by reducing at least a portion of the phosphorus-halogen compounds to a phosphorus trihalide outside said reaction zone and recycling at least a portion of the same to the reaction zone.

6. In a process for halogenating a phosphate ore which includes reacting a mixture comprising particulate phosphate ore and carbon with a halogenating agent in a reaction zone at a temperature sufficient to produce a product comprising metal halide and volatile phosphorus-halogen compounds, the improvements which comprise replacing the carbon and halogenating agent with phosgene and increasing the rate of the halogenation reaction by reducing at least a portion of the phosphorus-halogen compound to a phosphorus trihalide outside said reaction zone and recycling at least a portion of the same to said reaction zone.

7. In a process for halogenating phosphate ore which includes reacting a mixture comprising a particulate phosphate ore with a halogenating agent in a reaction zone at a temperature sufficient to produce a product comprising metal halide and volatile phosphorus-halogen compounds, the improvements which comprise increasing the rate of the halogenation reaction by reducing at least a portion of the phosphorus-halogen compounds to a phosphorus trihalide outside said reaction zone and recycling at least a portion of the same to the reaction zone.

References Cited

UNITED STATES PATENTS 2,773,736  12/1956  Hollingsworth _____ 23—319

CARL D. QUARFORTH, *Primary Examiner.*

L. DEWAYNE RUTLEDGE, *Examiner.*

S. TRAUB, R. L. GRUDZEICKI, *Assistant Examiners.*